June 28, 1955      R. HUBER      2,711,719

FREE PISTON ENGINE PHASE RELATION CONTROL

Filed May 16, 1950      3 Sheets-Sheet 1

INVENTOR
ROBERT HUBER
BY
ATTORNEYS

INVENTOR
ROBERT HUBER
BY
ATTORNEYS

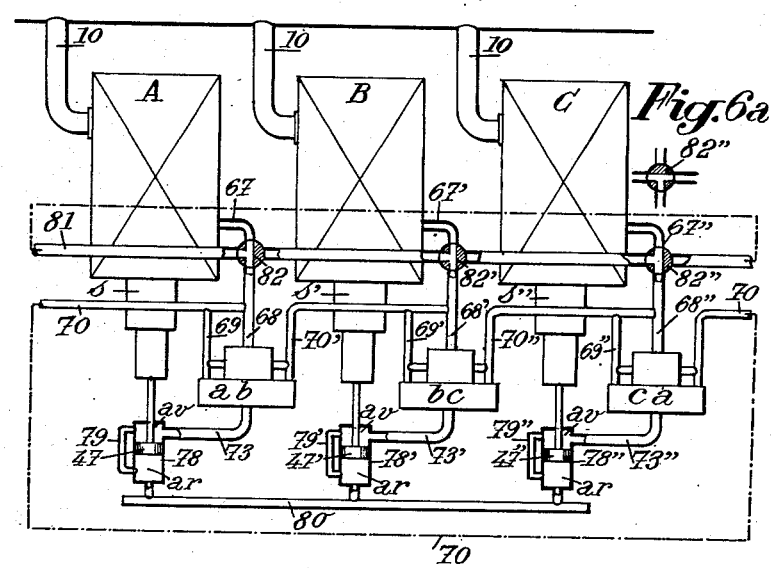
Fig. 6
Fig. 6a
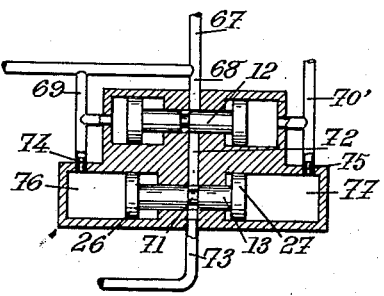
Fig. 7
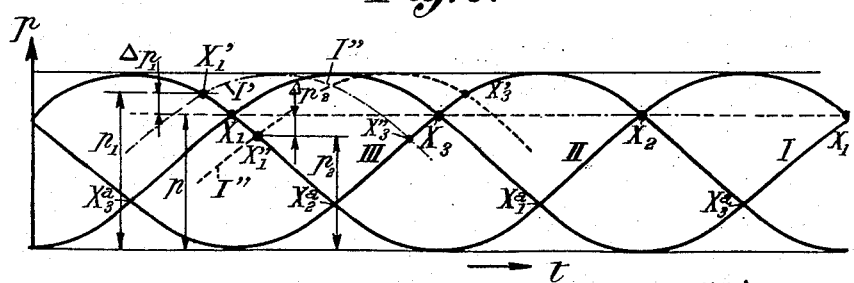
Fig. 8

United States Patent Office 2,711,719
Patented June 28, 1955

2,711,719

FREE PISTON ENGINE PHASE RELATION CONTROL

Robert Huber, Bellevue, France, assignor to "Societe d'Etudes et de Participations Eau, Gaz, Electricite Energie," S. A., Geneva, Switzerland, a society of Switzerland Application May 16, 1950, Serial No. 162,216

Claims priority, application France May 28, 1949

12 Claims. (Cl. 123—46)

The present invention relates to devices for keeping a given phase relation between the operations of at least two free piston machines belonging to a plant for supplying a fluid under pressure.

Its object is to provide a device of this kind which is better adapted to meet the requirements of practice than those used for the same purpose up to the present time.

It consists chiefly in making use of the differential action of the respective pressures in one variable volume chamber of one machine and in the corresponding variable volume chamber of the other machine to supply pressure impulses of a value proportional to that of the pressure existing in said chambers when both of them are at the same pressure, said pressure impulses controlling through suitable means the frequency of reciprocation of at least one of said machines to restore the desired phase relation between the movements of the respective pistons of said machines.

Preferred embodiments of my invention will be hereinafter described with reference to the accompanying drawings, given merely by way of example and in which:

Fig. 1 diagrammatically shows in section two free piston auto-generators provided with a phase relation maintaining device according to my invention;

Fig. 6 diagrammatically shows, with certain parts in section, a plant including three auto-generators and fitted with a phase relation maintaining device according to the invention;

Fig. 7 is a sectional view on a larger scale of some elements of a phase relation maintaining device of the plant of Fig. 6;

Fig. 8 is a diagram showing the variation as a function of time of the pressure in the return energy accumulators of the plant of Fig. 6.

Figure 1:
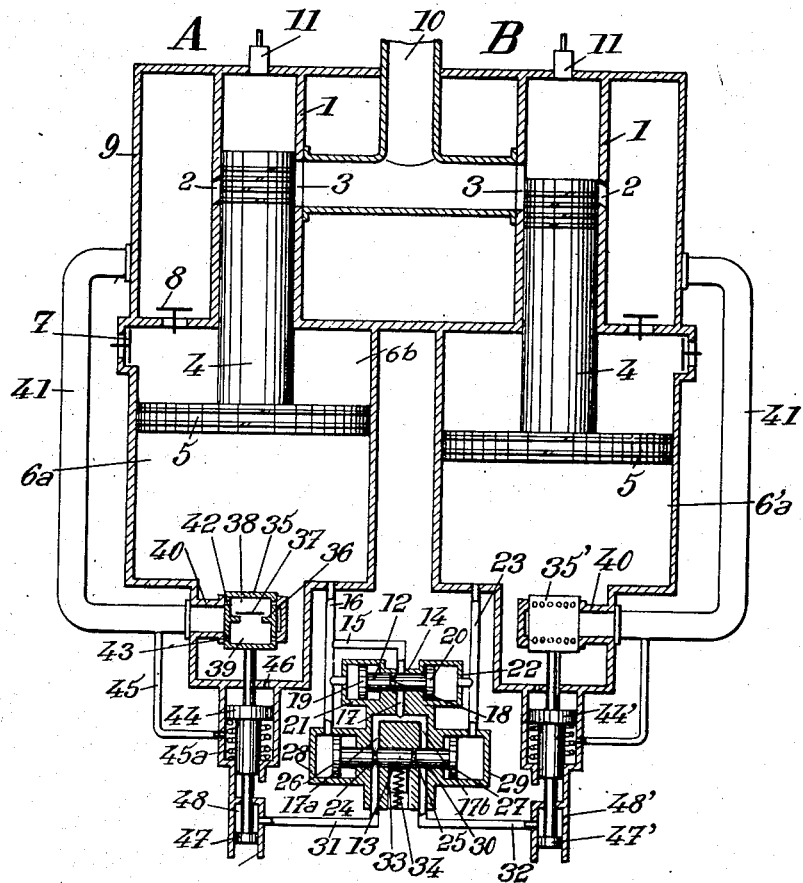
Fig. 1a is an enlarged view in section of a portion of the structure of Fig. 1.
Figure 1A:
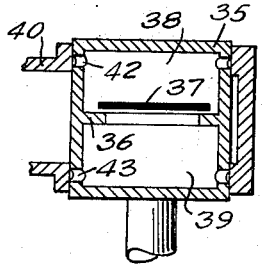
Figure 5:
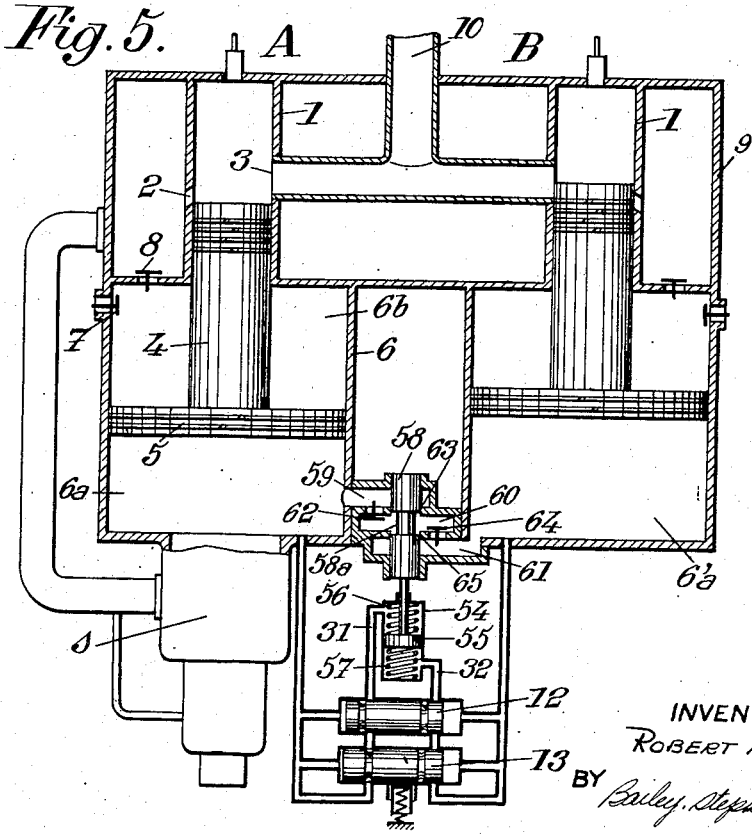
Fig. 5 is a diagrammatic section of a plant including two free piston auto-generators fitted with a phase relation maintaining device made according to another embodiment of the invention.

Concerning the auto-generators, with the exception of the means for keeping a given phase relation between them, they may be constituted in any suitable manner, for instance as indicated by Figs. 1 and 5 of the annexed drawings.

Each of these auto-generators includes a power cylinder 1 provided with inlet ports 2 and outlet ports 3, these ports being controlled by a power piston 4 which works in power cylinder 1. The power piston 4 is rigid with a compressor piston 5 working in a compressor cylinder 6. This cylinder 6 is divided by compressor piston 5 into two chambers one of which, 6a, (6'a), located on the outer side, that is to say on the opposite side from power cylinder 1, constitutes a return energy pneumatic accumulator (cushion), whereas compartment 6b, located on the inner side of compressor piston 5, constitutes the compressor space proper, fitted with suction valves 7 and delivery valves 8.

Figure 2:
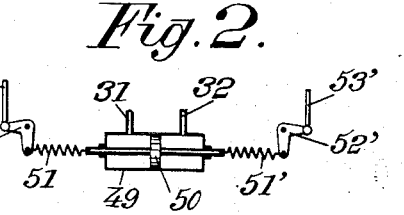
Fig. 2 shows a modification of this device.

The power cylinder 1 of each auto-generator is disposed inside a casing 9 which, in the plants of Figs. 1 and 2, is common to both of the auto-generators A and B which constitute the plant shown by these drawings. The air, which is first compressed in compressor space 6b and then discharged through delivery valves 8, is stored up in casing 9, from which it enters, for feed and scavenging purposes, into either of the power cylinders 1 of generators A and B, as soon as the intake port 2 of either of these cylinders is opened by the corresponding power piston.

In these auto-generators, the combustion gases, at the end of the expansion stroke of power piston 4, are at a pressure above atmospheric pressure corresponding to the air pressure in casing 9. These combustion gases form, together with the scavenging air, a hot mixture under pressure which flows out, through the exhaust ports of power cylinders 1 and an exhaust conduit 10, into a reservoir or toward a receiver for this hot gas under pressure which is common to both of the auto-generators A and B of the plant in question. This mixture of air and hot combustion gas under pressure constitutes the fluid under pressure which is to be supplied by the plant.

It should further be noted that the power portion of each auto-generator works on the two-stroke diesel cycle, fuel being injected into the power cylinder by means of an injector 11 which is supplied in the known manner, at the proper time, from an injection pump not shown on the drawing.

In order to have minimum pressure variations in casing 9 and/or in exhaust pipe 10, a suitable phase relation must be maintained between the movements of the sets of pistons of the respective generators, this phase relation depending upon the number of said generators. When this number is equal to two, the optimum phase difference is equal to 180°, which means that the movements of the respective sets of pistons of generators A and B must always be in opposed directions. In order to ensure the desired phase difference without mechanically interconnecting the sets of pistons of the two generators, the plant is fitted with a phase relation maintaining device. According to my invention, this device, which is intended to maintain or, in case of disturbance, to restore the desired phase relation between the movements of the respective sets of pistons, is controlled by the pressure existing in two analogous gas filled spaces of variable volume (in particular the respective return energy pneumatic accumulators of the auto-generators), when both of these spaces are at the same pressure, for opposed directions of movement of the pistons working therein.

Figure 3:
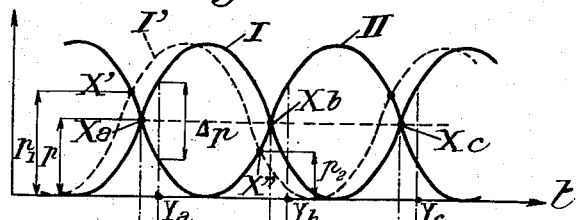
Fig. 3 is a diagram showing the variation as a function of time of the pressures in the return energy accumulators of the two generators of the plant of Fig. 1.

The diagram of Fig. 3 makes it possible to understand this feature of my invention. In this diagram, curve I shows the pressure variations in the accumulator 6a of generator A, the pressure being plotted in ordinates and the times "t" in abscissas, whereas curve II shows the pressure variations in the accumulator 6'a of generator B.

The phase difference between curves I and II in Fig. 3 is 180°, which, as above stated, is the optimum phase difference for a plant including two generators. For this phase difference, the points of intersection Xa, Xb, Xc, . . . of the two curves are all located at the same level, i. e. all correspond to the same pressure "p" the value of which is well determined for a given stable working control.

When the phase difference between the movements of the sets of pistons of the two auto-generators A and B differs from the desired 180° value, for instance when curve I, due to a disturbance in the desired phase relation, is displaced so as to become curve I' in dotted lines, the points of intersection X' and X'' of curves I' and II not only no longer correspond to pressure "p" but correspond to different pressures for X' and X''. Fig. 3 shows that, during the period for which the set of pistons of generator A is on its outward stroke (compression of air in the corresponding accumulator 6a) and for which the set of pistons of generator B is on its inward stroke (expansion of air in the corresponding accumulator 6'a), the pressures in the respective accumulators become equal (point X') for a value $p^1$ of the pressure which is higher than pressure "p." But the pressure $p^2$ which corresponds to intersection point X'' is lower than pressure "p."

For the generator which is in leading phase relation (curve I') equality of the pressures during the outward strokes therefore takes place for too high a pressure whereas for the generator which is in lagging phase relation (curve II), equality of the pressures, when the set of pistons of this last mentioned generator is on its outward stroke, takes place for too low a pressure.

According to my invention, the differences between pressure p and pressure $p^1$ (and/or pressure $p^2$) are used to operate a control device capable of influencing one of the factors which determine the frequency of reciprocation of the set of pistons of at least one of the two generators to restore the desired phase difference of 180° (for which equality of the pressures in the cushions 6a, 6'a of the two generators always occurs at pressure p).

Such a factor may be the mass of air present in the return energy pneumatic accumulator of one generator. The greater the mass of air in such an accumulator, the higher the number of reciprocations per unit of time. It is this factor which is varied in the plants shown by the drawings.

Concerning the device which works as a function of the difference between pressures p and $p^1$ and/or between pressures p and $p^2$, which device will be hereinafter called phase relation adjusting device, it may, of course, be constituted in many ways.

According to an embodiment which seems to be particularly advantageous, this device includes two control members 12 and 13. The first of these members, called "measuring member," makes it possible to measure the value of the pressure in the cushions of the two generators when the pressure is the same in both of them, this value of the pressure being hereinafter called "equality" pressure. The other member, called "distributing member," causes the equality pressure thus measured to act upon that of the two auto-generators which is to be subjected to the action of the measured pressure so as to restore the desired phase relation. If the equality pressure measured during the outward stroke of the set of pistons of generator A corresponds to an intersection point such as X' (Fig. 3) and is therefore $p^1$, higher than p, pressure $p^1$ is to act to slow down this generator. On the contrary, if the equality pressure, measured in the same conditions, is lower than p, it is to act to accelerate generator A.

In an analogous manner, if the equality pressure $p^2$ which corresponds to intersection point X'' and is measured during the outward stroke of the set of pistons of generator B, is lower than p, $p^2$ is to act on generator B to accelerate its operation and on the contrary, if this equality pressure is higher than p, it is to act to slow down auto-generator B. Distributing member 13 is therefore intended to cause the equality pressures measured by member 12 during the outward stroke of the set of pistons of auto-generator A to act on this auto-generator and the equality pressures measured during the outward stroke of the set of pistons of auto-generator B to act thereon.

In other words, if each of the auto-generators is controlled by the equality pressure occurring during the outward stroke of the set of pistons of this auto-generator, a value of the equality pressure higher than pressure "p" is to act to slow down the auto-generator, whereas a value of the equality pressure lower than pressure "p" is to act to accelerate the auto-generator.

Things should be reversed if I used as control impulses for each generator not the equality pressures occurring during the outward stroke of the set of free pistons thereof but the equality pressures occurring during the inward stroke of the set of pistons.

In the embodiment shown by Fig. 1, the measuring and distributing members are both in the form of slide valves each subjected to the action of the pressures existing in the return energy accumulators of auto-generators A and B. Concerning measuring member 12, it is slidable in a cylindrical housing 14 in the wall of which opens a conduit 15 which, through another conduit 16, is constantly in communication with the inside of the accumulator 6a of one of the auto-generators, for instance auto-generator A.

Another conduit 17 also opens in the inner wall of housing 14, for instance opposite conduit 15. A groove 18 provided in slide valve 12 is adapted to connect conduits 15 and 17 when said groove is located just opposite the openings of conduits 15 and 17.

Slide valve 12 carries at its ends pistons 19 and 20 which work in cylinders 21, 22. Cylinder 21 communicates, through conduit 16, constantly with the inside of the return energy accumulator 6a of generator A, whereas cylinder 22 communicates constantly, through a conduit 23, with the inside of the accumulator 6'a of generator B.

Under the influence of the instantaneous pressures in the respective accumulators, slide valve 12 is generally in either of its end positions which are determined by the abutting of either of pistons 19, 20 against the end of its respective cylinder. In each of these end positions, groove 18 is outside of the plane of the openings of conduits 15 and 17 and there is no communication between conduits 15 and 17. This communication takes place only for a short time during the motion of slide valve 12 from one of its end positions toward the other one.

Concerning distributing member 13, its construction is analogous to that of measuring member 12. This distributing member is in the form of a slide valve provided with two grooves 24 and 25 and two pistons 26 and 27. Piston 26 works in a cylinder 28 which communicates though conduit 16 with the inside of the accumulator 6a of auto-generator A, whereas piston 27 works in a cylinder 29 which communicates through conduit 23 with the inside of the accumulator 6'a of auto-generator B. In the wall of the housing 30 of this slide valve open two branches 17a and 17b of conduit 17 and opposite these branch conduits 17a and 17b respectively two other conduits 31 and 32. The axial distance between the openings of branch conduits 17a and 17b is equal to that between the openings of conduits 31 and 32 but it is different from that between grooves 24 and 25. Pistons 26 and 27 determine, when abutting against the end walls of their respective cylinders, two end positions of distributing member 13. In one of these final positions (that indicated by Fig. 1), groove 24 provides a communication between branch conduit 17a and conduit 31, whereas, in this position, branch conduit 17b is not connected with conduit 32. On the contrary, in the other end position of distributing member 13, branch conduit 17a and conduit 31 are unconnected and branch conduit 17b and conduit 32 communicate with each other.

Although members 12 and 13 are actuated by the same pressures, care must be taken that the movement of distributor 13 takes place after the movement of measuring member 12. This is why distributing member 13 is subjected to the action of a brake constituted for instance by a shoe 33 applied by a spring 34 against the side wall of member 13 and intended to delay the movement of this last mentioned member.

It will be readily understood that measuring member 12 remains in its end position shown by Fig. 1 as long as the instantaneous pressures existing in the accumulator 6'a of auto-generator B and which act upon piston 20 are higher than the instantaneous pressures existing in the accumulator 6a of auto-generator A and which act upon piston 19. Immediately after the respective pressures in the two accumulators have passed through their equality value (point $X_a$ or $X'$ of Fig. 3), the situation is reversed and measuring member 12 passes to its other end position, thus bringing into communication, for a very short period, conduits 16 and 17. During this short period, the pressure which then exists in the accumulator of auto-generator A and which is practically equal to the equality pressure (point $X_a$ or $X'$) is transmitted, through branch conduit 17a, to conduit 31 which, due to the lag in the movement of slide valve 13, is still in communication through groove 24 with said branch conduit 17a.

A short time thereafter, when the rising pressure prevailing in the accumulator of generator A has grown higher by an amount $\Delta_p$ than the pressure existing in the accumulator of generator B (see Fig. 3, time $Y_a$), slide valve 13, overcoming the friction exerted by shoe 33, also moves to its other end position, in which this slide valve cuts off the communication between branch conduit 17a and conduit 31 and establishes communication between branch conduit 17b and conduit 32.

Immediately after the pressures have again become equal in both accumulators (point $X_b$ or $X''$), the pressures begin to become unequal in the opposite sense and the measuring member 12 returns to its prior position, opening for a short time the communication between conduits 15 and 17 and thus making it possible for a pressure practically equal to either pressure $p$ (corresponding to point $X_b$) or pressure $p^2$ (corresponding to point $X''$) to be transmitted to conduit 32 which, at this time, due to the delay in the movement of slide valve 13, is connected through groove 25 with branch conduit 17b.

Figure 4:
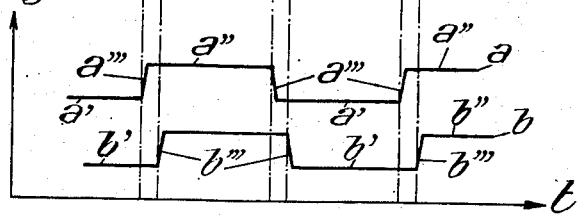
Fig. 4 illustrates, in the form of a diagram, the co-operation of the control members belonging to the phase relation maintaining device of the plant shown by Fig. 1.

Fig. 4 diagrammatically shows the effect and mutual relation of the movements of slide valves 12 and 13. The broken line $a$ indicates the positions, as a function of time, of slide valve 12 when the phase relation is correct (points of intersection $X_a$, $X_b$, $X_c$). The horizontal portions $a'$ of this line $a$ indicate the periods for which slide valve 12 is in the end position shown by Fig. 1. The horizontal portions $a''$ indicate the periods for which slide valve 12 is in the other end position and the nearly vertical portions $a'''$ indicate the periods for which slide valve 12 moves from one of its end positions to the other one.

The broken line $b$ of Fig. 4 illustrates the movements of distributing slide valve 13.

The horizontal portions $b'$ of this line $b$ indicate the periods for which slide valve 13 is in the end position shown by Fig. 1, in which groove 24 connects branch conduit 17a with conduit 31. Portions $b''$ indicate the periods for which slide valve 13 is in the opposed end position and connects branch conduit 17b with conduit 32 through groove 25, and portions $b'''^1$ indicate the periods for which the slide valve is moving from one of these end positions to the other one.

The pressure impulses thus transmitted to conduit 31 and corresponding to equality pressures during the outward strokes of generator A are to leave the working conditions of this last mentioned generator unchanged if they correspond to pressure $p$. On the contrary, they are to cause a slowing down of generator A when they correspond to equality pressure values higher than $p$ and an acceleration of the operation of said generator when they correspond to equality pressure values lower than $p$. The pressure impulses transmitted to conduit 32 are to act in a corresponding fashion on generator B. This effect of the pressure impulses transmitted to conduits 31 and 32 can be obtained in many different ways. For instance, these impulses may be caused to act upon the device which normally controls, in the known manner, as a function of the pressure prevailing in casing 9 and of the mean pressure in cushion 6a, the mass of air in this cushion, this device being called a "stabilizer." In the plant illustrated by Fig. 1, each auto-generator A and B is provided with such a stabilizer.

This stabilizer includes a slide valve 35 (35') in the form of a box divided by an inner partition 36 fitted with a check valve 37 in two chambers 38 and 39, check valve 37 being disposed in such manner that air can flow only from chamber 39 to chamber 38. Slide valve 35 (35') is housed in a guiding sleeve 40 and this guiding sleeve is located, together with the slide valve, in the cushion 6a (6'a) of the corresponding generator. Furthermore the sleeve 40 of each generator is connected through a conduit 41 with casing 9 and the wall of each chamber 38 and 39 is provided with a row of apertures 42 and 43 respectively. When slide valve 35 is in the position shown by Fig. 1, the two series of apertures 42 and 43 are closed by sleeve 40 and the air contents of the energy accumulator remains unchanged. If slide valve 35 is moved upwardly, so that the apertures 43 communicate with conduit 41 and the apertures 42 communicate with the inside of the accumulator, a certain amount of air can flow in from casing 9, through chambers 39 and 38 into cushion 6a, whereas the flow of air in the opposed direction is prevented by check valve 37. Cushion 6a is thus fed with air during the periods when the pressure in the cushion is lower than the pressure existing in the casing.

Inversely, when slide valve 35 is moved downwardly, so that apertures 42 communicate with the inside of conduit 41, whereas apertures 43 communicate with the inside of the cushion, a certain amount of air present therein can escape through apertures 43, chamber 39, chamber 38 and apertures 42 toward casing 9, whereas inflow of air into the cushion is made impossible by check valve 37. In this last mentioned position of slide valve 35, only a reduction of the mass of air present in the accumulator can take place during the periods for which the pressure in the accumualtor (cushion) is higher than that in casing 9.

In order to obtain, independently of the desired phase relation, automatic control of the stabilizer in accordance with the other operation conditions (working pressure, length of stroke) of the auto-generator, a piston 44 (44') rigid with slide valve 35 (35') is subjected to the action on the one hand of the pressure existing in casing 9 and which is transmitted to one of the sides of the piston through a conduit 45, the action of this pressure being posibly reinforced by that of a spring 45a, and, on the other hand, of the mean pressure in the cushion, which is applied, through an opening 46 of reduced section, to the other side of piston 44 (44').

Furthermore, and according to the present invention, system 35—44 (or 35'—44') is submitted to the action of the pressure impulses transmitted respectively through conduits 31 and 32. For this purpose, piston 44 (44') is rigidly assembled with a second piston 47 (47') working in a cylinder 48 (48') and the pressure impulses produced in conduits 31 and 32 respectively are transmitted to this cylinder.

As long as auto-generators A and B work in phase opposition, i. e. with a phase difference of 180° between the respective reciprocating movements of their sets of pistons, the stabilizers exert their normal stabilizing action, concerning the working pressures and lengths of stroke of the two auto-generators.

In these conditions of phase opposition the pressure transmitted by impulses through conduits 31 and 32 to cylinder 48 is equal to $p$ (Fig. 3). When, for any reason whatever, this desired phase difference between the movements of the respective pistons of auto-generators A and B no longer exists, the pressures transmitted through conduits 31 and 32 to cylinders 48 and 48' are different from $p$. For instance if the curve I of Fig. 3 comes into I' (curve in dotted lines), the pressure transmitted on every impulse to cylinder 48 becomes $p_1$ higher than $p$. Under the effect of this pressure rise, piston 47 is moved downwardly. Sleeve 35, rigid with piston 47, is moved downwardly. As above explained, this causes some amount of air to flow out from cushion chamber 6a into casing 9 through ports 43 and 42. On the other hand, the pressure transmitted by impulses through conduit 32 to cylinder 48' becomes $p_2$, lower than $p$. Under the effect of this pressure reduction, piston 47' moves upwardly, together with sleeve 35' which, as above explained, causes air to flow from casing 9 into cushion chamber 6'a, thus accelerating the reciprocating motion of the pistons of generator B. The desired opposed phase relation between auto-generators A and B is thus quickly restored.

Due to the slowing down of generator A and the acceleration of generator B, the desired phase relation of 180° is soon restored.

Of course, instead of acting both by slowing down one of the generators and accelerating the other one, I might act on only one of the generators in the desired manner.

In this case, only the pressure impulses corresponding to point Xa or X' would be used for controlling the rate of operation of auto-generator A and the pressure impulses corresponding to point Xb or X" would not be used.

When it is desired to make use, for controlling the stabilizer or stabilizers, not of the full value of pressures $p^1$ or $p^2$, but merely of the difference between pressures $p$ and $p^1$ or between $p$ and $p^2$, the outer face of pistons 47 and 47' may be constantly subjected to a pressure equal to the mean value of the equality pressures in the cushions, this mean value being equal either to $p$ or to a value ranging from $p$ to $p^1$ and $p^2$ respectively.

Of course, instead of causing the pressure impulses transmitted through conduits 31 and 32 to act directly upon the stabilizers of auto-generators A and B, these pressure impulses may be caused to act indirectly upon said stabilizers, for instance through a device such as shown by Fig. 2. With this construction, conduits 31 and 32 open into a cylinder 49 on either side of a piston 50 reciprocable in this cylinder. This piston 50 is connected on either side to a spring 51 (51') and each spring acts, through suitable mechanical means, for instance a bell crank lever 52 (52'), upon a rod 53 (53') fixed to piston 44 (44').

If both conduits 31 and 32 transmit the same pressure $p$ (case of a phase difference of 180°) on the opposite sides of piston 50, this piston remains in its intermediate position in which it exerts no influence upon the normal working of the stabilizers. However, if, for instance, conduit 31 transmits pressure $p^1$ to the left hand side of piston 50 and if, at the same time, piston 32 transmits pressure $p^2$ to the right hand side of piston 50, this piston, under the effect of the difference between these pressures, is moved toward the right, which compresses spring 51' and expands spring 51. Slide valve 35 is thus moved downwardly, which corresponds to evacuating a certain amount of air from cushion 6a, while piston 35' is moved upwardly, which causes a certain amount of air to be introduced into cushion 6'a. The effect is therefore exactly the same as that above described, concerning the phase adjusting device shown by Fig. 1.

Of course, as above implied, the invention is in no way limited to the case in which the phase adjusting device acts upon the stabilizer of the auto-generators. The phase adjusting device might also act directly upon the amounts of air present in the accumulators 6a and 6'a, so as to produce, when the phase difference becomes different from the desired value, the transfer of a certain amount of air from the cushion of the generator to be slowed down to the cushion of the generator to be accelerated, in order to restore the desired phase relation.

Such an embodiment is illustrated by Fig. 5 in which the elements having the same function as some elements of Fig. 1 are designated by the same numerals.

In the plant shown by Fig. 5, conduits 31 and 32, controlled as above described by measuring member 12 and distributing member 13 (the latter being, according to Fig. 5, on the upstream side of the measuring member), open into the two chambers of a cylinder 54, analogous to cylinder 49 of Fig. 2, separated from each other by a piston 55 slidable in said cylinder and normally held in an intermediate position by springs 56 and 57. This piston actuates a distributor 58 interposed in a system of conduits interconnecting the cushions 6a and 6'a of generators A and B. This communication system includes three spaces 59, 60 and 61. Space 59 is constantly in communication with the cushion 6a of generator A and communicates with space 60 on the one hand through a check valve 62 opening only in the direction from space 59 toward space 60 and, on the other hand, through an opening 63 controlled by distributor 58 the central portion of which is provided with a groove 58a. Space 61 is constantly in communication with the cushion 6'a of generator B and communicates with space 60, on the one hand through the intermediate of a check valve 64 opening only in the direction from space 61 toward space 60 and, on the other hand, through an aperture 65 also controlled by distributor 58.

As long as the same pressure $p$ (phase difference of 180°) acts on both sides of piston 55, distributor 58 remains in its position shown by Fig. 5, in which position it cuts off any communication between cushions 6a and 6'a. However, as soon as a change of phase relation occurs, for instance as soon as auto-generator A gets in leading phase relation to auto-generator B, the pressure transmitted from cushion 6a to the upper side of piston 55 will be equal to $p^1$, whereas the pressure transmitted from cushion 6'a to the under side of piston 55 will be equal to $p^2$. As $p^1$ is higher than $p^2$, distributor 58 is moved downwardly, thus opening aperture 65, which causes a certain amount of air to be transferred from cushion 6a to cushion 6'a. Consequently, auto-generator A, which was leading in phase, will be slowed down whereas auto-generator B, which was lagging in phase, will be accelerated, so that the desired phase difference of 180° will be restored.

If auto-generator B had assumed a leading phase relation with respect to auto-generator A, the higher pressure $p^1$ would have acted upon the lower side of piston 55 and the lower pressure $p^2$ upon the upper side thereof. Distributor 58 would have moved upwardly, thus opening aperture 63, which would have caused a certain amount of air to be transferred from cushion 6'a to cushion 6a. The 180° phase difference would thus also have been restored.

It should be noted that, in a plant in which the desired phase relation of the auto-generators is obtained by the transfer of a certain amount of air from the return energy accumulator of one of the generators to the return energy accumulator of the other generator, it may be sufficient, according to a second feature of my invention which may possibly be used separately, to provide only one of the auto-generators with a stabilizer of the above mentioned type. This is due to the fact that every action of this stabilizer upon one of the generators brings about a certain disturbance of the phase relation, which disturbance has for its effect to equalize the amounts of air in the accumulators of the respective generators through the phase adjusting device. In other words, the stabilizer of one of these generators acts, through the phase adjusting device, on the other generator or generators of the plant.

Thus, in the plant of Fig. 5, generator A is fitted with a stabilizer $s$, whereas the other generator B is not provided with a stabilizer.

In the preceding description, it has been supposed that the phase adjusting device according to my invention is applied to a plant including only two auto-generators, the phase relation of which is to be kept at 180°. However, the phase adjusting device according to my invention can be applied to plants including any number of auto-generators, in particular to plants including three auto-generators, which are to be kept in phase relation of 120° to one another when the three generators are in operation, whereas the phase relation must be 180° when only two of the three auto-generators are in operation.

The annexed Figs. 6 and 7 show such a plant including free piston auto-generators A, B, C the constructional details of which correspond to those above described and illustrated by Figs. 1 and 5, with the difference that, in the plant shown by Fig. 6, the casings of the generators are not in communication with one another. In the plant of Fig. 6, only the three exhaust conduits 10 deliver the hot power gases under pressure into a common pipe 66.

The plant including the three auto-generators A, B and C is provided with three phase adjusting devices $ab$, $bc$, $ca$, phase adjusting device $ab$ being operated by the instantaneous pressures prevailing in the cushions of generators A and B, phase adjusting device $bc$ being operated by the instantaneous pressures prevailing in the cushions of generators B and C and phase adjusting device $ca$ being operated by the instantaneous pressures prevailing in the cushions of generators A and C. For this reason, conduit 67 which communicates with the cushion or cushions of auto-generator A branches off into three conduits, to wit one 68 which transmits to phase adjusting device $ab$ the pressure to be measured and to be transmitted therethrough when the corresponding pressures have equal values, a second one 69 which transmits the instantaneous pressures in the cushion of auto-generator A to the measuring member 12 and the distributing member 13 of this phase adjusting device $ab$ (see Fig. 7), and a third one 70 which transmits these instantaneous pressures to the measuring and distributing members of phase adjusting device $ca$.

In an analogous manner, the pressures prevailing in the cushion or cushions of auto-generator B are transmitted, through conduits 67', 68', 69' and 70' to the phase adjusting devices $bc$ and $ab$. And the pressures prevailing in the cushion or cushions of auto-generator C are transmitted, through conduits 67'', 68'', 69'' and 70'' to phase adjusting devices $ca$ and $bc$.

Phase adjusting devices $ab$, $bc$, $ca$ may be of a construction quite analogous to that of Fig. 1, with the only difference that the distributing member 13 includes, for reasons hereinafter explained, only one groove 71. This groove is positioned to connect together, in one of the end positions of slide valve 13, for instance in the left hand one (see Fig. 7), a conduit 72, located opposite conduit 68, and a conduit 73 serving to transmit the pressure impulses transmitted through conduit 67 to the phase adjusting device or other means for varying the frequency of reciprocation of the pistons of the corresponding auto-generator.

The delay of distributing member 13 might also be obtained, as in Fig. 1, by friction of a shoe against this distributor. However, according to the embodiment shown by Fig. 7, this delay is obtained by providing a throttling aperture 74, 75 between each of the conduits 69 and 70' and the corresponding cylinder chambers of relatively large volume 76, 77 in which work, respectively, the pistons 26, 27 of distributing member 13. Throttling apertures 74, 75 serve to delay the building up of pressure in cylinder chambers 76 and 77, whereby the operation of distributing member 13 takes place with a certain delay with respect to the operation of measuring member 12. The effect is therefore the same as that of the friction shoe 33 of Fig. 1.

In order to facilitate a good understanding of the operation of the phase adjusting devices of the plant shown by Fig. 8, I have shown, on Fig. 8, the variation as a function of time of the pressures that prevail in the accumulators of the respective auto-generators A, B and C.

In the diagram of Fig. 8, curve I represents the pressure variations in the cushion or cushions of generator A. Curve II represents these variations in generator B and curve III in generator C.

The position of these three curves with respect to one another corresponds to the case of the three generators working with the desired phase difference of 120°. This diagram shows that the points of intersection $X_1$ (between curves I and II), $X_3$ (between curves III and I) and $X_2$ (between curves II and III) are, for this desired phase relation, all located at the same level, corresponding to an equality pressure $p$.

It should be noted that, in the present case, contrary to what takes place in a plant including two auto-generators in phase relation of 180°, the second point of intersection, respectively designated by $X^a{}_1$, $X^a{}_2$ and $X^a{}_3$ between two given curves is not located at the same level as the first point $X_1$, $X_2$, $X_3$. This is why only one of these points can be used for controlling the phase relation between the auto-generators and not both at the same time.

In the plant shown by Figs. 6 and 7, I use only the equality pressures corresponding to intersection points $X_1$, $X_2$, $X_3$. This is why the distributing member 13, according to Fig. 7, is provided with only one groove 71.

In the case of phase adjusting device $ab$, this groove gives passage, in the position shown by Fig. 7 and during the movement of slide valve 12 from left to right, only to the equality pressure which corresponds either to point $X_1$ (pressure $p$) when the phase relation of auto-generators A and B (curves I and II) is correct, or to intersection point $X'_1$ (pressure $p_1$, auto-generator A being in leading phase relation, curve I'), or again to point $X''_1$ (pressure $p_2$, auto-generator A being in lagging phase relation, curve I'').

The effect is analogous for the phase adjusting device $bc$ which corresponds to generator B and for the phase adjusting device $ca$ which corresponds to generator C.

The pressure impulses received by conduit 73 (phase adjusting device $ab$), 73' (phase adjusting device $bc$) or 73'' (phase adjusting device $ca$) may be used in a manner analogous to that above described for controlling the stabilizer designated respectively by $s$, $s'$, $s''$ of the corresponding auto-generator.

For this purpose, the pressure impulses act for instance upon a piston 47 (47', 47'') rigid with the piston 44 of this stabilizer. In the plant shown by Fig. 6, the rear face of each piston 47 (47', 47'') is subjected to the mean value of the impulse pressures which act upon the front faces of these same pistons and which are transmitted to each piston through, respectively, conduit 73, 73', 73''. For this purpose, the two chambers $av$ and $ar$ which are formed in each cylinder 78 (78', 78'') by piston 47 (47', 47'') are connected together by means of a by-pass conduit 79 (79', 79'') of small cross section.

Furthermore, the chambers $ar$ of the three cylinders 78, 78', 78'' are interconnected by a collector conduit 80.

As long as the equality pressures supplied through conduits 73 (73', 73'') to chambers $ar$ are all equal to $p$, that is to say as long as the three generators A, B and C work in the desired phase relation, the pressure in chambers $ar$ being equal to $p$, pistons 47, 47', 47'' are in the balanced state and have no action upon stabilizers $s$, $s'$, $s''$. If, on the contrary, the phase relation of one of the auto-generators undergoes a disturbance, if, for instance, generator A assumes a leading phase relation with respect to generator B, curve I becoming curve I', the point of intersection $X_1$ moves toward $X'_1$ and intersection point $X_3$ moves toward $X''_3$. The equality pressure measured by phase adjusting device $ab$ and transmitted to the chamber $av$ of cylinder 78 is then equal to $p_1$, whereas the equality pressure measured by phase adjusting device $ca$ and transmitted to the chamber $av$ of cylinder 78" is then equal to $p_2$. As the mean pressure in chambers $ar$ remains substantially equal to $p$, the difference $\Delta p_1$ between $p_1$ and $p$ acts in such manner, through the intermediate of piston 47, on stabilizer $s$, that this stabilizer causes a certain amount of air to be evacuated from the accumulator of generator A, which causes this accumulator to slow down, whereas the difference $\Delta p_2$ between $p$ and $p_2$ acts through piston 47" upon stabilizer $s''$ so as to accelerate the working of generator C. This acceleration in turn influences phase adjusting device $bc$ so as to moderate the acceleration of generator C and to produce a slight acceleration of generator B. Due to these slowing down and accelerating actions, the desired phase relation is restored between the three generators.

In order to obtain, in case of stopping of one of the three generators, a phase difference of 180° between the two generators which remain in action, I may use a connecting conduit 81 which constitutes a closed circuit interconnecting conduits 67, 67' and 67" at places located upstream of the branchings of conduits 70, 70' and 70", three way cocks 82, 82', 82" being interposed at the places where conduit 81 crosses each of the conduits 67, 67' and 67".

When the three auto-generators A, B and C are in operation, each of these cocks 82, 82', 82" is in the position shown by Fig. 6, so that the pressure impulses of the accumulator of each auto-generator are transmitted to the respective phase adjusting devices and the transverse connection between conduits 67, 67' and 67" is cut off. On the contrary, if one of the auto-generators, for instance auto-generator C, is stopped, the corresponding cock, that is to say, in this case, cock 82", is turned into the position shown by Fig. 6a. In this last mentioned position, valve 82" cuts off conduit 67" but establishes a communication between the portion of conduit 81 which is on the left hand side of cock 82 and in which prevail the pressures of the cushion of auto-generator A and the portion of conduit 67" from which conduit 70" branches off. Consequently, phase adjusting device $bc$ which, when the three generators were in operation, worked in accordance with the pressures in the cushion of generators B and C, now works in accordance with the pressures prevailing in the cushions of generators A and B, that is to say in accordance with the same pressures which act also upon phase adjusting device $ab$. These two phase adjusting devices consequently have an operation quite analogous to that of the phase adjusting device illustrated by Fig. 1, whereby the generators A and B which remain in action work with a phase relation of 180°.

A wholly similar effect would be obtained if generator A or generator B had been stopped and the cock 82 or 82' corresponding to the stopped generator had been turned into the position shown by Fig. 6a.

It should be noted that my invention also applies to the case in which the free piston machines of the plant are not auto-generators but motor-compressors or free piston pumps, or when the factor upon which depends the frequency of reciprocation of the set or sets of pistons and which is controlled by the phase adjusting device is a factor other than the mass of air present in the return energy pneumatic accumulator or in the accumulators of this kind of the free piston machine.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A plant for supplying a fluid under pressure which comprises, in combination, at least two free piston machines intended to work in given phase relation to each other, each machine comprising at least one stationary unit including two cylinders and at least one reciprocating unit including a power piston and a compressor piston mounted to cooperate with said cylinders respectively, the stationary and reciprocating units of each machine constituting between them gas filled variable volume chambers, means responsive to the differential action of the respective gas pressures in one variable volume chamber of one machine and in the corresponding variable volume chamber of the other machine for supplying pressure impulses of a value proportional to that of the pressure existing in said respective two last mentioned chambers when both of them are at the same pressure, and means responsive to variations of the pressure of said impulses for varying the frequency of reciprocation of the reciprocating unit of at least one of said machines to restore the desired phase relation between the reciprocating movements of said two reciprocating units in case of departure therefrom.

2. A plant for supplying a fluid under pressure which comprises, in combination, at least two free piston machines intended to work in given phase relation to each other, each machine comprising at least one stationary unit including two cylinders and at least one reciprocating unit including a power piston and a compressor piston mounted to cooperate with said cylinders respectively, the stationary and reciprocating units of each machine constituting between them gas filled variable volume chambers, a conduit extending from one of said chambers, valve means in said conduit, means responsive to the differential action of the respective gas pressures in said variable volume chamber and in the corresponding variable volume chamber of the other machine for successively opening and closing said valve means every time said differential action is reversed, other valve means in the same conduit, means responsive with a given delay to the differential action of the respective pressures in said two last mentioned chambers for closing said second mentioned valve means every second time said first mentioned valve means have been opened and closed and opening said second mentioned valve means every other time said first mentioned valve means have been opened and closed, and means connected with the portion of said conduit on the downstream side of both of said valve means and responsive to variations of the pressure intermittently supplied by said conduit for varying the frequency of reciprocation of the reciprocating unit of one of said machines to restore the desired phase relation between the reciprocating movements of said two reciprocating units in case of departure therefrom.

3. A plant for supplying a fluid under pressure which comprises, in combination, at least two free piston machines intended to work in given phase relation to each other, each machine comprising at least one stationary unit including two cylinders and at least one reciprocating unit including a power piston and a compressor piston mounted to cooperate with said cylinders respectively, the stationary and reciprocating units of each machine constituting between them gas filled variable volume chambers, a conduit extending from one of said chambers, a slide valve in said conduit, two pistons rigid with the respective ends of said slide valve, a cylinder for each of said last mentioned pistons, means for transmitting to said last mentioned cylinders the respective gas pressures in said variable volume chamber and in the corresponding variable volume chamber of the other machine to act in opposition on said slide valve, said slide valve being arranged to be closed in either of its end positions and to open for an intermediate position thereof so as to let a pressure impulse be transmitted from said first mentioned chamber past said slide valve every time said slide valve is shifted from one end position to the other, another slide valve in the same conduit, two pistons rigid with the respective ends of said last mentioned slide valve, a cylinder for each of said last mentioned pistons, means for transmitting to said cylinders the respective pressures in said chambers to act in opposition on said last mentioned slide valve, means for delaying the displacements of said last mentioned slide valve under the effect of the differential action of said pressures, said last mentioned slide valve being arranged in one of its end positions to open said conduit and in the other position to close said conduit, and means connected with the portion of said conduit on the downstream side of both of said slide valves and responsive to variations of the pressure of the impulses transmitted through said conduit for varying the frequency of reciprocation of the reciprocating unit of one of said machines to restore the desired phase relation between the movements of said reciprocating units in case of departure therefrom.

4. A plant for supplying a fluid under pressure which comprises, in combination, at least two free piston machines intended to work in given phase relation to each other, each machine comprising at least one stationary unit including two cylinders and at least one reciprocating unit including a power piston and a compressor piston mounted to cooperate with said cylinders respectively, the stationary and reciprocating units of each machine constituting between them gas filled variable volume chambers, at least one of said machines including a stabilizer device for controlling the frequency of reciprocation of the reciprocating unit thereof, means responsive to the differential action of the respective gas pressures in one variable volume chamber of one machine and in the corresponding variable volume chamber of the other machine for supplying pressure impulses of a value proportional to that of the pressure existing in said two last mentioned chambers, and means responsive to variations of the pressure of said impulses for controlling said stabilizer device to restore the desired phase relation between the movements of said reciprocating units in case of departure therefrom.

5. A plant for supplying a fluid under pressure which comprises, in combination, two free piston machines intended to work in 180° phase relation to each other, each machine comprising at least one stationary unit including two cylinders and at least one reciprocating unit including a power piston and a compressor piston mounted to cooperate with said cylinders respectively, the stationary and reciprocating units of each machine constituting between them gas filled variable volume chambers, only one of said machines including a stabilizer device for controlling the frequency of reciprocation of the reciprocating unit thereof, means responsive to the differential action of the respective gas pressures in one variable volume chamber of one machne and in the corresponding variable volume chamber of the other machine for supplying pressure impulses of a value proportional to that of the pressure existing in said two last mentioned chambers, and means responsive to variations of the pressure of said impulses for controlling said stabilizer device to restore the desired phase relation between the movements of said reciprocating units in case of departure therefrom.

6. A plant for supplying a fluid under pressure which comprises, in combination, two free piston machines intended to work in 180° phase relation to each other, each machine comprising at least one stationary unit including two cylinders and at least one reciprocating unit including a power piston and a compressor piston mounted to cooperate with said cylinders respectively, the stationary and reciprocating units of each machine constituting between them gas filled variable volume chambers, a conduit extending from one of said chambers, valve means in said conduit, means responsive to the differential action of the respective gas pressures in said variable volume chamber and in the corresponding variable volume chamber of the other machine for successively opening and closing said valve means every time said differential action is reversed, two branch conduits extending from the part of said conduit on the downstream side of said valve means, valve means common to both of said branch conduits, means responsive with a given delay to the differential action of the respective pressures in said two last mentioned chambers for operating said second mentioned valve means every second time said first mentioned valve means have been opened and closed to open one of said branch conduits and close the other and every other time said first mentioned valve means have been opened and closed to close said first mentioned branch conduit and open the other, and means connected with the portions of said branch conduits on the downstream side of said second mentioned valve means and responsive to variations of the pressure intermittently supplied by said branch conduits for varying the frequency of reciprocation of the reciprocating unit of at least one of said machines to restore the desired phase relation between the movements of said two reciprocating units in case of departure therefrom.

7. A plant for supplying a fluid under pressure which comprises, in combination, two free piston machines intended to work in 180° phase relation to each other, each machine comprising at least one stationary unit including two cylinders and at least one reciprocating unit including a power piston and a compressor piston mounted to cooperate with said cylinders respectively, the stationary and reciprocating units of each machine constituting between them gas filled variable volume chambers, a conduit extending from one of said chambers, valve means in said conduit, means responsive to the differential action of the respective gas pressures in said variable volume chamber and in the corresponding variable volume chamber of the other machine for successively opening and closing said valve means every time said differential action is reversed, two branch conduits extending from the part of said conduit on the downstream side of said valve means, valve means common to both of said branch conduits, means responsive with a given delay to the differential action of the respective pressures in said two last mentioned chambers for operating said second mentioned valve means every second time said first mentioned valve means have been opened and closed to open one of said branch conduits and close the other and every other time said first mentioned valve means have been opened and closed to close said first mentioned branch conduit and open the other, and two means each connected with the portion of one of said branch conduits on the downstream side of said second mentioned valve means and responsive to variations of the pressure intermittently supplied by said last mentioned branch conduit for varying the frequency of reciprocation of the reciprocating unit of one of said machines respectively to restore the desired phase relation between the movements of said two reciprocating units in case of departure therefrom.

8. A plant for supplying a fluid under pressure which comprises, in combination, two free piston machines intended to work in 180° phase relation to each other, each machine comprising at least one stationary unit including two cylinders and at least one reciprocating unit including a power piston and a compressor piston mounted to cooperate with said cylinders respectively, the stationary and reciprocating units of each machine constituting between them gas filled variable volume chambers, a conduit extending from one of said chambers, valve means in said conduit, means responsive to the differential action of the respective gas pressures in said variable volume chamber and in the corresponding variable volume chamber of the other machine for successively opening and closing said valve means every time said differential action is reversed, two branch conduits extending from the part of said conduit on the downstream side of said valve means, valve means common to both of said branch conduits, means responsive with a given delay to the differential action of the respective pressures in said two last mentioned chambers for operating said second mentioned valve means every second time said first mentioned valve means have been opened and closed to open one of said branch conduits and close the other and every other time said first mentioned valve means have been opened and closed to close said first mentioned branch conduit and open the other, means for controlling the frequency of reciprocation of the reciprocating unit of at least one of said machines and a pressure responsive differential device, having its inputs connected with the portions of said respective branch conduits on the downstream side of said second mentioned valve means, for operating said reciprocating unit frequency controlling means to restore the desired phase relation between the movements of said two reciprocating units in case of departure therefrom.

9. A plant for supplying a fluid under pressure which comprises, in combination, two free piston machines intended to work in 180° phase relation to each other, each machine comprising at least one stationary unit including two cylinders and at least one reciprocating unit including a power piston and a compressor piston mounted to cooperate with said cylinders respectively, the stationary and reciprocating units of each machine constituting between them a gas filled variable volume chamber acting as a return energy pneumatic accumulator, a conduit extending from one of said accumulators, valve means in said conduit, means responsive to the differential action of the respective pressures in the accumulators of said machines for successively opening and closing said valve means every time said differential action is reversed, two branch conduits extending from the portion of said conduit on the downstream side of said valve means, valve means common to both of said branch conduits, means responsive with a given delay to the differential action of the respective pressures in said accumulators for operating said second mentioned valve means every second time said first mentioned valve means have been opened and closed to open one of said branch conduits and close the other and every other time said first mentioned valve means have been opened and closed to close said first mentioned branch conduit and open the other, means for transferring air from one accumulator to the other, and a pressure responsive differential device having its inputs connected with the portions of said respective branch conduits on the downstream side of said second mentioned valve means for operating said air transferring means to restore the desired phase relation between the movements of said two reciprocating units in case of departure therefrom.

10. A plant according to claim 1 in which only one of said machines includes a stabilizer device operative in response to variations of the working pressure of said machine for controlling the frequency of reciprocation of the pistons thereof.

11. A plant for supplying a fluid under pressure which comprises, in combination, a plurality of free piston machines intended to work in given phase relation to one another, each machine comprising at least one stationary unit including two cylinders and at least one reciprocating unit including a power piston and a compressor piston mounted to cooperate with said cylinders respectively, the stationary and reciprocating units of each machine constituting between them gas filled variable volume chambers, a device for controlling the frequency of reciprocation of the reciprocating units of each of said machines, means differentially responsive to the actions of the respective pressures in the corresponding variable volume chambers of every group of two of said machines for supplying pressure impulses of a value proportional to that of the pressure existing in said two respective last mentioned chambers when both of them are at the same pressure, and means for controlling each of said devices, responsive to variations of the difference between the pressure of the impulses supplied by the corresponding differentially responsive means and the mean value of the pressures of the impulses supplied by the other means to restore the desired phase relation between the movements of said reciprocating units in case of departure therefrom.

12. A plant for supplying a fluid under pressure which comprises, in combination, three free piston machines intended to work in given phase relation to one another, each machine comprising at least one stationary unit including two cylinders and at least one reciprocating unit including a power piston and a compressor piston mounted to cooperate with said cylinders respectively, the stationary and reciprocating units of each machine constituting between them gas filled variable volume chambers, a device for controlling the frequency of reciprocation of the pistons of each of said machines respectively, means differentially responsive to the actions of the respective pressures in the corresponding variable volume chambers of every group of two of said machines for supplying pressure impulses of a value proportional to that of the pressure existing in said two respective chambers when both of them are at the same pressure, means for controlling each of said devices, responsive to variations of the pressure of the impulses supplied by the corresponding differentially responsive means, and valve means to be operated in case of stopping of one of said machines for both cutting the connection in normal operation between the chamber of said stopped machine and the differentially responsive means of one of the other machines and placing the chamber of the third machine in communication with said differentially responsive means.

References Cited in the file of this patent

UNITED STATES PATENTS

| | | |
|---|---|---|
| 2,408,362 | Beale | Oct. 1, 1946 |
| 2,470,231 | Beale | May 17, 1949 |
| 2,473,204 | Huber | June 14, 1949 |
| 2,501,030 | Cronstedt | Mar. 21, 1950 |